United States Patent [19]

Reimann

[11] 4,431,183

[45] Feb. 14, 1984

[54] MOTION SIMULATOR

[76] Inventor: Paul E. Reimann, 1014 E. Center St., Bountiful, Utah 84010

[21] Appl. No.: 377,516

[22] Filed: May 12, 1982

[51] Int. Cl.³ .............................................. A63G 9/14
[52] U.S. Cl. .................................. 272/85; 272/33 R; 272/110; 272/112; 434/29
[58] Field of Search ....................... 434/29, 30, 33, 34, 434/51, 60; 272/28 R, 28 S, 33 A, 35, 39, 40, 41, 42, 43, 46, 48, 85, 33 R

[56] References Cited

U.S. PATENT DOCUMENTS

| | | | |
|---|---|---|---|
| 1,044,391 | 11/1912 | Jones | 272/40 |
| 1,087,722 | 2/1914 | Brundage | 272/40 X |
| 2,152,679 | 4/1939 | Bisch | 272/40 |
| 2,169,403 | 8/1939 | Bartlett | 272/41 |
| 2,804,123 | 8/1957 | Kling | 272/33 A |
| 2,831,685 | 4/1958 | Stewart | 272/33 R |
| 3,145,990 | 8/1964 | Prouty | 272/85 X |
| 3,171,651 | 3/1965 | Meroich et al. | 272/33 R |
| 3,186,711 | 6/1965 | Morrow | 272/85 |
| 3,528,657 | 9/1970 | Krupsky | 272/85 |
| 3,726,521 | 4/1973 | Sidlauskas | 272/41 |
| 4,014,540 | 3/1977 | Caulkins | 272/85 |

FOREIGN PATENT DOCUMENTS 776040  1/1968  Canada .............................. 272/33 A

*Primary Examiner*—William H. Grieb
*Attorney, Agent, or Firm*—Donald J. Singer; Bobby D. Scearce

[57] ABSTRACT

A novel motion simulation device adaptable as a training, amusement or playground device is provided which comprises a support structure pivotally attached at one end to an overhead suspension, and supporting, near the other end, a passenger carrying body; a resiliently extensible tether connected at one end to the support structure near the passenger carrying body, and at the other end to a substantially fixed point below the point of suspension, to limit and define the pattern of swinging motion of the structure; a spring operatively interconnecting the support structure and suspension to provide simulated bobbing motion for the device; and braking structure, utilizing the tether, for stopping the device. Certain optional embellishments may be included to limit motion of the device to selected degrees of freedom.

7 Claims, 6 Drawing Figures

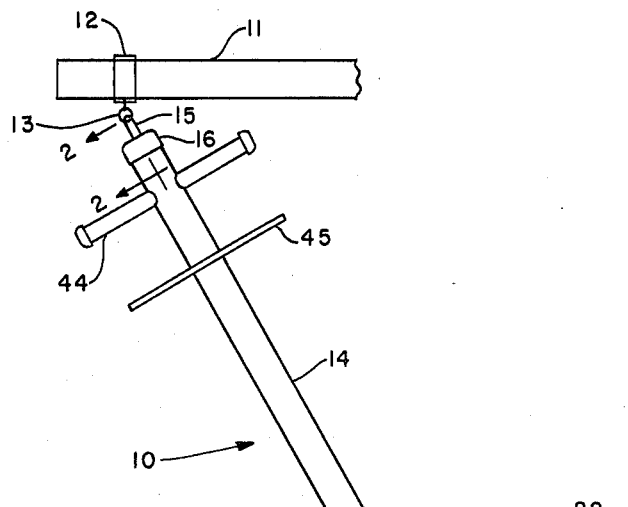
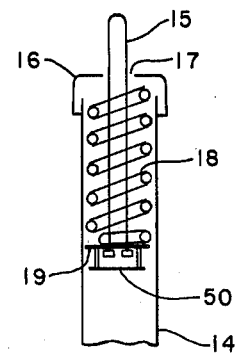
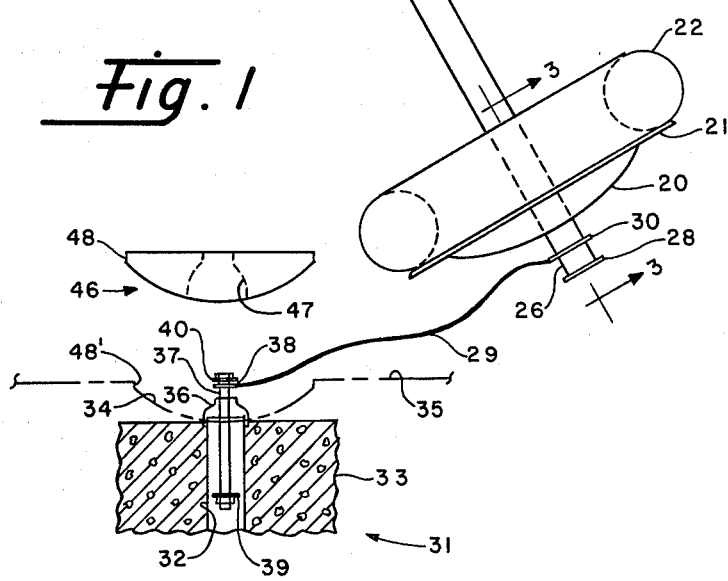
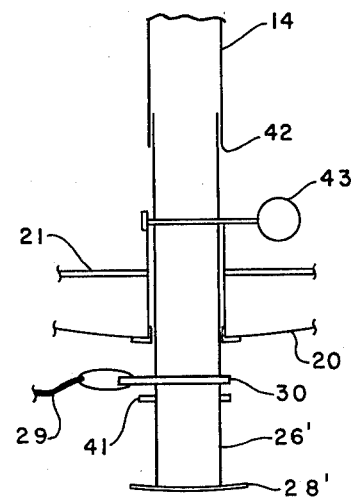
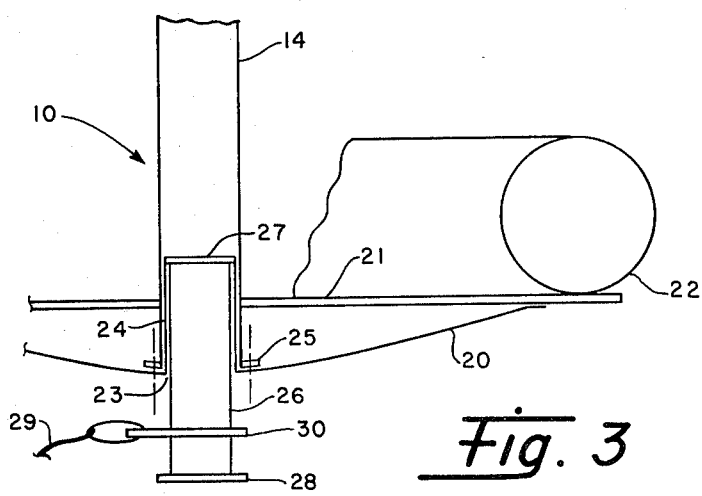

MOTION SIMULATOR

RIGHTS OF THE GOVERNMENT

The invention described herein may be manufactured and used by or for the Government of the United States for all governmental purposes without the payment of any royalty.

BACKGROUND OF THE INVENTION

This invention relates generally to the field of motion simulation devices, and more particularly to a novel suspended motion device adaptable as a training, recreational, or playground device.

The present invention provides a novel device which may be used to realistically simulate the pitching, rolling and bobbing motion characteristic of small sailing craft, life rafts, and the like. The device comprises a passenger carriage suspended to provide circular, elliptical, spinning or oscillating motion, and may include spring means within the suspension configuration to provide simulated bobbing motion. The device may be configured to revolve or oscillate about a fixed point or set of points by attaching one or more flexible tethers to the carriage to define specific preselected motion patterns for the device, and may be used in conjunction with separate driving means to sustain the desired motion. This invention may therefore provide controllable simulation of a small sailing craft or survival raft for training purposes. Certain embodiments are therefore easily adaptable to a recreational or playground device.

It is, therefore, an object of the present invention to provide an improved motion simulation device.

It is a further object of the present invention to provide a motion simulator particularly adaptable as a training device.

It is yet another object of this invention to provide a motion simulation device having multiple degrees of freedom of movement.

Another object of the present invention is to provide a motion simulation device particularly adaptable to recreational or playground use.

These and other objects of the present invention will become apparent as the detailed description of certain representative embodiments thereof proceeds.

SUMMARY OF THE INVENTION

In accordance with the foregoing principles and objects of the present invention, a novel motion simulation device adaptable as a training, amusement or playground device is provided which comprises a support structure pivotally attached at one end to an overhead suspension means, and supporting, near the other end, a passenger carrying body; a resiliently extensible tether connected at one end to the support structure near the passenger carrying body, and at the other end to a substantially fixed point below the point of suspension, to limit and define the pattern of swinging motion of the structure; spring means operatively interconnecting the support structure and suspension means to provide simulated bobbing motion for the device; and braking means, utilizing the tether, for stopping the device. Certain optional embellishments may be included to limit motion of the device to selected degrees of freedom.

DESCRIPTION OF THE DRAWINGS

The present invention will be more clearly understood from the following detailed description of certain specific embodiments thereof read in conjunction with the accompanying drawings wherein:

FIG. 1 is a schematic elevational view in partial section of one embodiment of the present invention.

FIG. 2 is an enlarged sectional view of the device of FIG. 1 taken along lines 2—2 thereof, illustrating a representative suspension configuration.

FIG. 3 is an enlarged fragmentary sectional view of the FIG. 1 device, taken along lines 3—3 thereof showing a representative carriage configuration.

FIG. 4 shows an alternative configuration to that of FIG. 3, but including a braking mechanism for the device of FIG. 1.

DETAILED DESCRIPTION

Figure 1A:
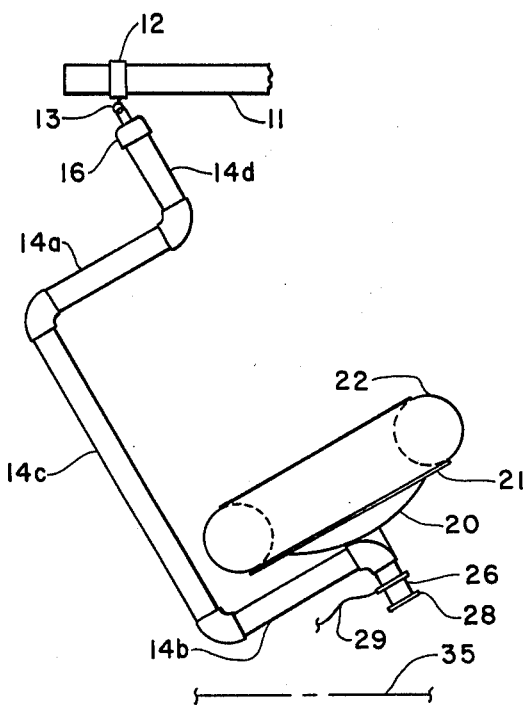
FIG. 1a is a schematic elevational view of an embodiment of the invention utilizing a "C"-shaped support structure.

Referring now to FIG. 1, one embodiment of the motion simulation device of the present invention is designated generally therein by the numeral 10. Device 10 may be suspended in any convenient fashion using a suitable overhead support such as beam 11 supporting a bracket 12 and eyebolt 13. At the option of the user, the eyebolt 13 may be fixed against rotation relative to bracket 12, in which case the suspended device 10 does not spin about its own axis; therefore, each rider faces substantially whatever direction he initially faced, thereby minimizing dizziness, and better simulating sailboat or raft motion. Alternatively, the bracket 12-eyebolt 13 assembly may be in the form of a swivel, universal joint, or ball and socket configuration (not shown) in order to allow rotative motion of device 10 about its axis.

Device 10 may comprise, in a preferred embodiment thereof, as shown in FIG. 1, an upright central standard or pipe 14, of appropriate length, suspended at its upper extremity from eyebolt 13 and bracket 12 by U-bolt 15 or the like. U-bolt 15 may be either rigidly affixed to pipe 14 through a fitting such as pipe cap 16, or resiliently mounted within pipe 14 as shown in FIG. 2, which is an enlarged sectional view of the upper extremity of pipe 14 taken along lines 2—2 of FIG. 1. As shown in FIG. 2, U-bolt 15 may have sufficient length to extend into pipe 14 through a hole 17 in cap 16. A spring 18 may be disposed within pipe 14 at its upper extremity and held in place between cap 16 and upturned ends of U-bolt 15 (not shown) or between cap 16 and a washer plate 19 bolted to the ends of U-bolt 15. The configuration of FIG. 2 therefore allows limited axial movement of pipe 14 relative to fixed support 11 through compression of spring 18. A shock absorber (not shown) could additionally be used and disposed within pipe 14 coaxially with spring 18. This feature of the invention provides an additional degree of freedom of motion of the device 10 to simulate the bobbing motion of a craft. Further, this feature is particularly desirable as incorporated into a recreational or playground device.

Optionally, a second plate 50 may be bolted in parallel spaced relationship to and below plate 19, substantially as shown in FIG. 2, so that the bobbing motion can be disabled by inserting crosswise through pipe 14 between parallel plates 19 and 50 a removable bolt (not shown) so as to prevent compression of spring 18.

Figure 3A:
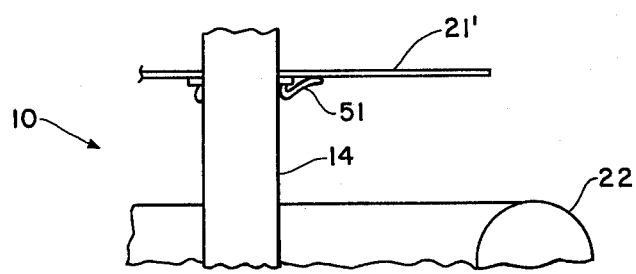
FIG. 3a is a fragmentary view of the FIG. 1 device illustrating alternative use as a table.

Near the lower extremity of pole 14, and attached thereto, is a passenger carriage, which may, as in the embodiment depicted in FIG. 1, comprise a metallic inverted spherical shell section 20 supporting a circular floor 21 and annular bench 22. Assembly of the device 10 may be as shown in FIG. 3, which is a sectional view taken along lines 3—3 of FIG. 1. Shell 20 has a central hole 23 sized for receiving a short section of pipe 24 to which shell 20 is secured. Pipe 24 is of outside diameter just smaller than the inside diameter of pipe 14 so that pipe 24 may be inserted into pipe 14 substantially as shown. Within pipe 24 is another, smaller diameter pipe 26, flared or flanged at each end 27 and 28 in order to limit its axial movement within pipe 24. Pipe 14 has a flare, flange or collar 25 to which shell 20 may be bolted against the lower extremity of pipe 14. Floor 21 may be secured to shell 20, and bench 22 to floor 21, by conventional means (not shown in the drawings) such as bolts, straps or the like. For alternative use of device 10 as hereinafter described, floor 21 may be smaller in diameter than either shell 20 or bench 22, and may be supported at its periphery within shell 20; bench 22 may then be conventionally attached directly to the peripheral edge of shell 20.

The configuration of the device 10 as shown in FIG. 1 includes a pipe 14 in the form of a single elongate upstanding central pole. Alternatively, the support structure represented by the pipe 14 may be configured in the shape of a "C" including upper and lower horizontal sections 14a and 14b, respectively, connected by a vertical section 14c, as shown in FIG. 1a. Accordingly, the passenger carriage just described may then be supported on the lower horizontal section 14b, and the device suspended from an overhead support 11 connected to the upper horizontal section 14b. In this configuration, a short vertical section 14a including the suspension configuration of FIG. 2 may be included between the upper horizontal section 14a and the overhead support 11. This particular configuration may be desirable for raft motion simulation.

Near the bottom of device 10 may be attached one end of a detachable elastic tether 29 secured to a ring 30 on pipe 26, ring 30 being free to slip and rotate on pipe 26 between limits defined by flange 28 and the lower surface of shell 20. The other end of tether 29 may be detachably anchored near floor or ground level at any desirable location, preferably near a locus directly below the bracket 12. A desirable anchor configuration 31, as shown schematically in FIG. 1 and having multiple functions as hereinbelow described, was constructed for use in conjunction with an embodiment of device 10 built in demonstration of the invention herein.

Anchor 31 may comprise a section of pipe 32 set in concrete 33 at the bottom of a small depression 34 a few inches below ground level 35. Pipe 32 is capped with a reducer fitting 36 having a smaller diameter sized to slideably receive a large bolt 37 to which tether 29 is connected by way of ring 38. Bolt 37 extends down within pipe 32 and terminates with a washer plate 39 having sufficient diameter to slip easily within pipe 32 but to prevent bolt 37 from being withdrawn through reducer 36. Anchor configuration 31 may serve purposes other than limiting the motion of device 10. For example, bolt 37 may be configured to terminate at its upper end with an externally threaded portion or collar 40 sized to be received by an internally threaded fitting (not shown) disposed within pipe 26 near flange 28. Device 10 may then be anchored firmly by positioning flange 28 over bolt 37, and raising bolt 37 to engage threaded collar 40 with the fitting within pipe 26. In this configuration, motion of device 10 is limited to bobbing motions within the limits of compression of spring 18, and lateral movement is prevented. When thus constrained against lateral motion, the pipe 14 may serve as a pole for climbing during playground or recreational use.

Referring now to FIG. 4, which presents an alternate configuration to FIG. 3 of the view along 3—3 of FIG. 1, device 10 may be provided with a braking mechanism. Therefore, pipe 26' (similar in size, position, and function to pipe 26 of FIG. 3) may have a collar 41 fixed thereon between shell 20 and flange 28'. In this configuration, ring 30 supporting one end of tether 29 is disposed on pipe 26' between shell 20 and collar 41. Means are provided for a passenger to raise pipe 26' while the device 10 is in motion. To this end, an axial slot 42 may be provided in pipe 14, to expose a portion of pipe 26', and through which means, such as handle 43 or the like, may be attached to pipe 26' near its upper end. In order then to stop the motion of device 10, a passenger may raise handle 43, causing collar 41 to press ring 30 against the bottom of shell 20, thereby preventing ring 30 from further slippage on pipe 26'. As device 10 then continues motion about anchor 31, tether 29 is wound upon that portion of pipe 26' between collar 41 and flange 28', gradually and steadily reducing the amplitude of motion of device 10 about anchor 31 as tether 29 is wound.

In order to simulate certain motions, it may be desirable to limit the motion of simulation device 10 using two or more elastic tethers 29, by anchoring one end of each tether at separate anchor points.

It is understood that the device 10 as described may be linked to conventional driving means in order to impart to device 10 a desired pattern of movement, either in conjunction with the limits defined by one or more extensible tethers, or in place thereof.

The patterns of movement thus attainable using the present invention may therefore simulate the pitching, rolling and bobbing of a small drifting sailing craft, such as a survival raft or the like.

The motion device 10 may be stored overhead, so as not to obstruct floor space when not in use, by detaching tether 29 from ring 38, and rotating device 10 upwardly for attachment to an eyebolt or the like (not shown) appropriately located overhead.

An insert 46 conforming to the shape and dimensions of depression 34 may optionally be used to fill depression 34 to provide a smooth, continuous floor surface when device 10 is not in use. An axial hole 47 may have a minimum diameter larger than threaded collar 40 so that bolt 37 and threaded collar 40 can be raised to engage threaded collar 40 with the fitting within pipe 26 as discussed above. Axial hole 47 may otherwise be configured to receive reducer 36 so that insert 46 may snugly fit into depression 34 after tether 29 has been detached from ring 38.

Insert 46 may have a cylindrical peripheral portion 48 configured to fit into a corresponding cylindrical upper edge portion 48' of depression 34. In this configuration, insert 46 may be inverted and inserted into depression 34, so that the convex surface of device 46 projects upwardly from ground or floor level 35. The larger diameter of hole 47 may be sized to snugly receive flange 28 so that both lateral and axial movement of device 10 is constrained without engagement with collar 40.

The motion device 10, in any of its contemplated embodiments as represented in the drawings, may be easily adaptable to an amusement ride or playground device for use in recreational facilities. Consistent with these uses, means may be provided near the upper end of pipe 14 to support a tent enclosure or other shelter, or a sail, the support means being represented in the FIG. 1 embodiment by a welded or threaded horizontal pipe section 44. Further, and in conjunction with anchor 31, the device 10 may be used as a picnic table by configuring and sizing bench 22 and floor 21 as indicated in the fragmentary view of FIG. 3*a* such that floor 21 may be raised to table 21′ level and there conventionally secured to pipe 14 by means such as bolts, clamps 51, or the like. The floor 21 may be further utilized to provide shade or additional shelter support by raising it to a level indicated in FIG. 1 by numeral designation 45 and there securing it conventionally by clamp 51, bolts or the like.

It is clear that in the practice of the invention herein, particularly in the use thereof as a playground device, conventional, readily available materials may be used. For example, standard pipe and fittings may be used in fabrication of the supporting structure, and an inflatable automotive inner tube, tire or the like may be used as a bench, which has the further advantage of providing a child's ride relatively free of significant injury hazards.

The present invention, as hereinabove described in certain representative embodiments thereof, therefore provides a novel motion simulation device which may conveniently be adapted for use as a training, recreational or playground device. It is understood that certain modifications to the invention as hereinabove described may be made as might occur to one with skill in the applicable field, within the scope of the appended claims. Therefore, all embodiments contemplated hereunder have not been shown in complete detail. Other embodiments may be developed without departing from the spirit of this invention or from the scope of the appended claims.

I claim:

1. A motion simulation device comprising:
   a. a passenger carrying body;
   b. overhead suspension means;
   c. support structure, pivotally supported at a first end thereof to said suspension means and supporting said passenger carrying body near a second end thereof, said support structure including a section thereof near said second end and extending below said passenger carrying body;
   d. a ring slidably mounted on said section; and
   e. A resiliently extensible tether connected at a first end thereof to said ring, and at a second end thereof to a substantially fixed point beneath said suspension means.

2. The device as recited in claim 1 wherein said suspension means is rotatable about a substantially vertical axis therethrough.

3. The device as recited in claim 1 further comprising a spring means, operatively interconnecting said support structure and said suspension means.

4. The device as recited in claim 1 wherein said second end of said tether is connected to a fixed point substantially vertically below said suspension means.

5. The device as recited in claim 1 further comprising means, interconnecting said ring and support structure, and controllable from said passenger carrying body, for releasably engaging said ring on said section to controllably prevent slippage of said ring thereon.

6. The device as recited in claim 1 wherein said section is axially movable between first and second axial limits.

7. The device as recited in claim 6 further comprising means, on said support structure and controllable from said passenger carrying body, for axially moving said section between said limits, to releasably engage said ring to prevent slippage thereof on said section at one of said limits.

* * * * *